United States Patent
Bastide et al.

(10) Patent No.: US 10,679,306 B2
(45) Date of Patent: Jun. 9, 2020

(54) FOCUS-OBJECT-DETERMINED COMMUNITIES FOR AUGMENTED REALITY USERS

(71) Applicant: INTERNATIONAL BUSINESS MACHINES CORPORATION, Armonk, NY (US)

(72) Inventors: Paul R. Bastide, Boxford, MA (US); Matthew E. Broomhall, Goffstown, NH (US); Liam S. Harpur, Dublin (IE); Lin Sun, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 59 days.

(21) Appl. No.: 15/818,988

(22) Filed: Nov. 21, 2017

(65) Prior Publication Data
US 2019/0156432 A1    May 23, 2019

(51) Int. Cl.
| | |
|---|---|
| G06Q 50/00 | (2012.01) |
| G06T 11/60 | (2006.01) |
| G06T 7/187 | (2017.01) |
| G06T 7/70 | (2017.01) |
| H04W 4/021 | (2018.01) |

(52) U.S. Cl.
CPC ............ *G06Q 50/01* (2013.01); *G06T 7/187* (2017.01); *G06T 7/70* (2017.01); *G06T 11/60* (2013.01); *H04W 4/021* (2013.01)

(58) Field of Classification Search
CPC .............................. G06Q 50/01; G06T 19/006
See application file for complete search history.

(56) References Cited

U.S. PATENT DOCUMENTS

| | | | |
|---|---|---|---|
| 8,370,425 B2 | 2/2013 | Cheng et al. | |
| 9,870,058 B2* | 1/2018 | McCoy | G06F 3/017 |
| 2008/0059390 A1* | 3/2008 | Cox | G06Q 30/02 |
| | | | 706/12 |
| 2011/0313657 A1* | 12/2011 | Myllymaki | G01C 21/3682 |
| | | | 701/438 |

(Continued)

FOREIGN PATENT DOCUMENTS

| | | |
|---|---|---|
| CN | 106651605 A | 5/2017 |
| WO | 2016053646 A1 | 4/2016 |
| WO | 2019102317 A1 | 5/2019 |

OTHER PUBLICATIONS

Mell et al., "The NIST Definition of Cloud Computing," US. Department of Commerce, National Institute of Standards and Technology, Sep. 2011, p. 1-7, Special Publication 800-145.

(Continued)

*Primary Examiner* — Ryan R Yang
(74) *Attorney, Agent, or Firm* — Robert D. Bean

(57) ABSTRACT

According to one embodiment, a method, computer system, and computer program product for creating a social network in augmented reality (AR) based on focus objects is provided. The present invention may include monitoring an augmented reality session of a user; detecting focus objects of a user during the augmented reality session; labeling the detected focus objects with indications of interest; associating the labeled detected focus objects with additional users; and establishing, based on the labelled detected focus objects, a social network, where the social network contains focus objects sourced from additional users.

17 Claims, 5 Drawing Sheets

(56) References Cited

U.S. PATENT DOCUMENTS

| | | | |
|---|---|---|---|
| 2012/0233032 A1* | 9/2012 | Calman | G06Q 30/02 |
| | | | 705/27.1 |
| 2014/0280554 A1* | 9/2014 | Webb | H04L 67/22 |
| | | | 709/204 |
| 2014/0306994 A1* | 10/2014 | Brown | G06T 19/006 |
| | | | 345/633 |
| 2014/0310056 A1* | 10/2014 | Alapati | G06Q 50/01 |
| | | | 705/7.28 |
| 2015/0088989 A1 | 3/2015 | Kaminsky et al. | |
| 2015/0106288 A1 | 4/2015 | Holman et al. | |
| 2015/0185827 A1 | 7/2015 | Sayed | |
| 2015/0338917 A1 | 11/2015 | Steiner et al. | |
| 2016/0019674 A1* | 1/2016 | Howard | H04L 67/10 |
| | | | 345/619 |
| 2016/0317859 A1 | 11/2016 | Dalmia | |
| 2016/0321932 A1 | 11/2016 | Mitchell et al. | |
| 2017/0032401 A1* | 2/2017 | Shifman | G06Q 30/0207 |
| 2017/0123613 A1 | 5/2017 | Sugiyama | |
| 2017/0337744 A1* | 11/2017 | Martin | G01S 19/14 |

OTHER PUBLICATIONS

Anonymous, "Method and System for Selecting Products to Display Based on Social Media User-Generated Content", An IP.com Prior Art Database Technical Disclosure, IP.com No. IPCOM000236117D, IP.com Electronic Publication Date: Apr. 7, 2014, pp. 1-3.

Jung et al., "Location-based Timely Cooperation over Social Private Network", 10th IEEE International Conference on Collaborative Computing: Networking, Applications and Worksharing (CollaborateCom 2014), Oct. 22-25, 2014, Miami, Florida, United States, pp. 388-396.

International Search Report and Written Opinion for International Application No. PCT/IB2018/058986, International Filing Date: Nov. 15, 2018, dated Feb. 28, 2019, 8 pages.

* cited by examiner

FOCUS-OBJECT-DETERMINED COMMUNITIES FOR AUGMENTED REALITY USERS

BACKGROUND

The present invention relates, generally, to the field of computing, and more particularly to augmented reality.

Augmented reality (AR) is a modern computing technology that uses software to generate images, sounds, haptic feedback, and other sensations to augment a real world environment. While the creation of this augmented environment can be achieved with general-purpose computing devices, such as cell phones, more specialized equipment is also used, typically in the form of glasses or headsets where computer generated elements are overlaid onto a view of the real world by being projected or mapped onto a lens in front of a user's eyes. With the help of computer augmentation, information about the surrounding world of the user, as well as other digital elements overlaid onto the world, become interactive and digitally manipulable. This technology has the potential to transform countless aspects of human life, from construction to military training to space exploration. One salient field where augmented reality is poised to make a significant impact is that of social networking. With the rampant success of such social media platforms as Facebook® (Facebook® and all Facebook®-based trademarks and logos are trademarks or registered trademarks of Facebook, Inc. and/or its affiliates), Instagram® (Instagram® and all Instagram®-based trademarks and logos are trademarks or registered trademarks of Instagram LLC and/or its affiliates) and Snapchat® (Snapchat® and all Snapchat®-based trademarks and logos are trademarks or registered trademarks of Snap Inc. and/or its affiliates), augmented reality seems likely to be the next direction in social networking.

SUMMARY

According to one embodiment, a method, computer system, and computer program product for creating a social network in augmented reality (AR) based on focus objects is provided. The present invention may include monitoring an augmented reality session of a user; detecting focus objects of a user during the augmented reality session; labeling the detected focus objects with indications of interest; associating the labeled detected focus objects with additional users; and establishing, based on the labelled detected focus objects, a social network, where the social network contains focus objects sourced from additional users.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
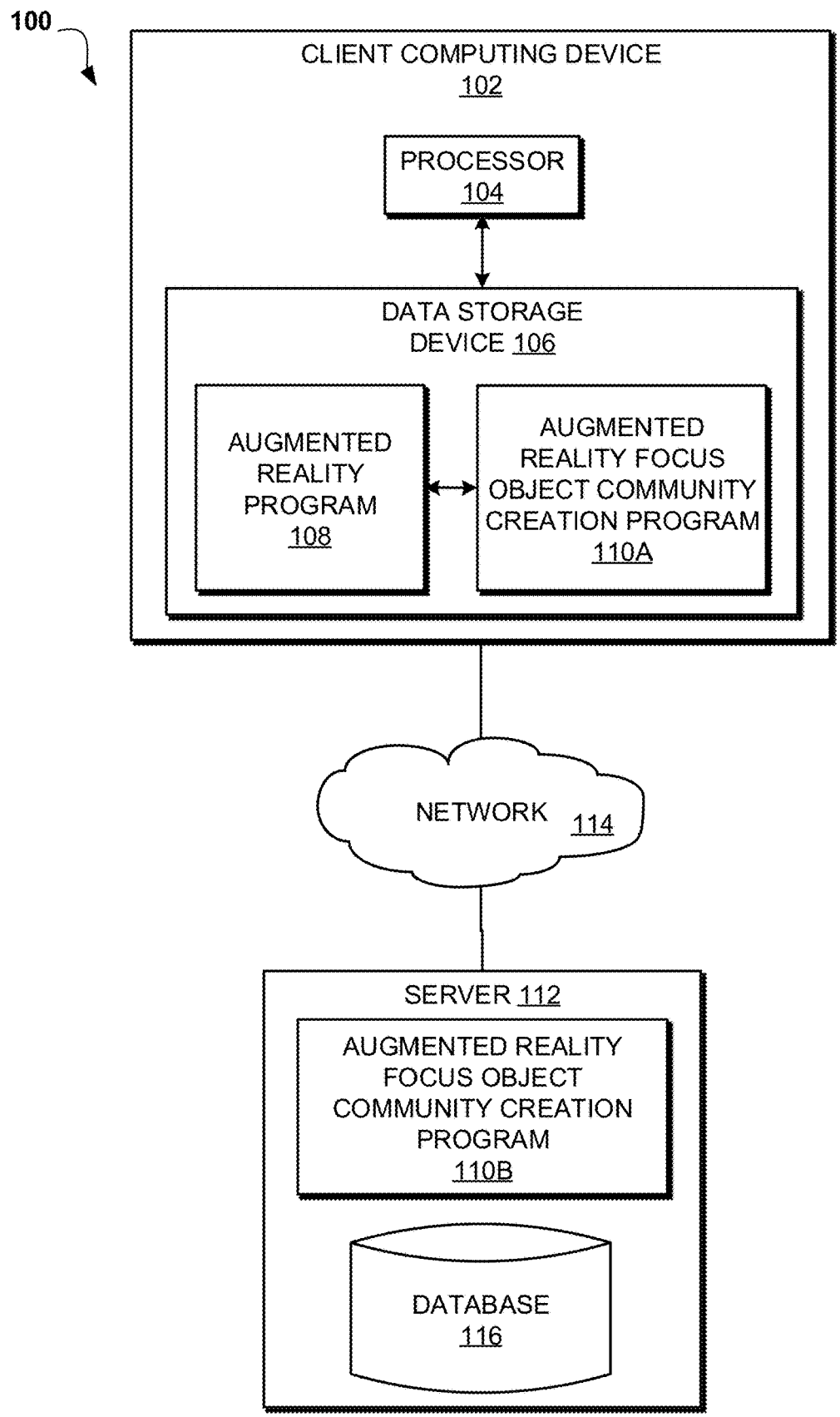
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to augmented reality (AR). The following described exemplary embodiments provide a system, method, and program product to, among other things, establish a social network within an AR session by locating, tagging, and aggregating focus objects of a user. Therefore, the present embodiment has the capacity to improve the technical field of augmented reality by generating temporary communities of interest for augmented reality, reducing friction to tap a community of interest, and improving the social networking capabilities of AR technology by allowing users to engage efficiently with others of similar interest.

As previously described, AR is a modern computing technology that uses software to generate images, sounds, haptic feedback, and other sensations to augment a real world environment. While the creation of this augmented environment can be achieved with general-purpose computing devices, such as cell phones, more specialized equipment is also used, typically in the form of glasses or headsets where computer generated elements are overlaid onto a view of the real world by being projected or mapped onto a lens in front of a user's eyes. With the help of computer augmentation, information about the surrounding world of the user, as well as other digital elements overlaid onto the world, become interactive and digitally manipulable. This technology has the potential to transform countless aspects of human life, from construction to military training to space exploration. One salient field where augmented reality is poised to make a significant impact is that of social networking. With the rampant success of such social media platforms as Facebook®, Instagram® and Snapchat®, augmented reality seems likely to be the next direction in social networking.

Many AR wearable vendors, such as Facebook®, Google® (Google® and all Google®-based trademarks and logos are trademarks or registered trademarks of Google Inc. and/or its affiliates), and Samsung® (Samsung® and all Samsung®-based trademarks and logos are trademarks or registered trademarks of Samsung Electronics Co., Ltd. and/or its affiliates), are driving changes in user behavior; AR platforms allow users to, among many other things, present contact information, combine reality with games, and overlay map information with reality. AR's combination of live views with digital flags and markers enables useful information to be presented and acted upon; there are many untapped possibilities to change experiences with AR. However, as of yet, there exists few methods in the art that capitalize on the social networking advantages of focus-object-based labeling, and communities of interest based on focus objects. As such, it may be advantageous to, among other things, implement a system capable of tracking the focus of users, labeling objects that are the target of a user's focus, and creating social networks based on the focus objects in order to allow users to connect and interact based on their interest in real world objects.

According to one embodiment, the invention may be a system that integrates communities of interest into augmented reality sessions, by monitoring the augmented reality session of a user, detecting focus objects of a user during the AR session, capturing and labeling the focus objects with an indication of interest, associating the labeled objects with users within a specified area, and establishing, based on the area and focus object, a geo-fenced social network. The monitoring may occur within a geo-fenced area, for a set number of objects or a maximum amount of time. As an example, where a user, named Alice, is using an AR device equipped with the system, the system may initiate monitoring the augmented reality session of Alice. Alice may use the AR device to determine what type of apples she is seeing. The system may detect focus objects of Alice, and label the objects as follows:

Green apple
Red apple

The system may further capture and label the focus objects with an indication of interest, as follows:

[Alice|green apple|25-FEB-2017|4:00 PM|30 seconds interest|x1, x2]
[Alice|red apple|25-FEB-2017|4:01 PM|15 seconds interest|x1, x2]

The system may further associate the labeled objects with users within a specified area, as follows:

[Bob|green apple|24-FEB-2017|4:00 PM|30 seconds interest|x1, x2]
[Bob|red apple|25-FEB-2017|3:01 PM|15 seconds interest|x1, x2]
[Bob|green apple|25-FEB-2017|3:00 PM|30 seconds interest|x1, x2]
[Charlie|red apple|25-FEB-2017|4:01 PM|15 seconds interest|x1, x2]
[Eve|green apple|25-FEB-2017|4:00 PM|30 seconds interest|x1, x2]
[Carey|red apple|25-FEB-2017|4:01 PM|15 seconds interest|x1, x2]
[Bob|fudge|24-FEB-2017|5:00 PM|30 seconds interest|x1, x2]
[Bob|popcorn|25-FEB-2017|4:01 PM|15 seconds interest|x1, x2]
[Bob|small car|25-FEB-2017|4:00 PM|30 seconds interest|x3, x4]
[Charlie|red apple|25-FEB-2017|5:01 PM|15 seconds interest|x1, x2]
[Eve|green apple|25-FEB-2017|5:00 PM|30 seconds interest|x1, x2]
[Carey|red apple|25-FEB-2017|5:01 PM|15 seconds interest|x1, x2]

The system may establish a geo-fenced social network based on the area, which aggregates both Alice's objects listed above, and the focus objects of other users listed above. The system may detect an overlap with Bob regarding the green-apple|red-apple labeling, and may establish a temporary social network with Bob. In such a situation, Alice might begin seeing Bob's updates and comments overlaid onto focus objects of his that appear within her vision. For instance, Alice may see a small car through AR, which Bob commented on earlier, and may see a conversation bubble overlaid on top of it containing Bob's comment, "What a perfect car!—Bob." Alice may then ask Bob questions regarding details of the car, and engage in a conversation with him on the topic, thereby engaging efficiently with others of similar interest.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to establishing a social network within an AR session by locating, tagging, and aggregating focus objects of a user.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run an AR program 108 and an AR focus-object community creation program 110A and communicate with the server 112 via the communication network 114, in accordance with one embodiment of the invention. AR program 108 may be any program capable of overlaying digital elements onto a direct or indirect view or representation of the real world. Client computing device 102 may be, for example, a mobile device, an AR headset, a telephone, a personal digital assistant, a netbook, a laptop computer, a tablet computer, a desktop computer, or any type of computing device capable of running a program, capturing a user's view, and accessing a network. As will be discussed with reference to FIG. 3, the client computing device 102 may include internal components 302a and external components 304a, respectively. Client computing device 102 may be integrated with or otherwise in communication with a camera for providing a real-time or near-real-time video feed of a user's vision.

The server computer 112 may be a laptop computer, netbook computer, personal computer (PC), a desktop computer, or any programmable electronic device or any network of programmable electronic devices capable of hosting and running an AR focus-object community creation program 110B and a database 116 and communicating with the client computing device 102 via the communication network 114, in accordance with embodiments of the invention. As will be discussed with reference to FIG. 3, the server computer 112 may include internal components 302b and external components 304b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud. The server computer 112 may be integrated with or otherwise in communication with a camera for providing a real-time or near-real-time video feed of a user's vision.

According to the present embodiment, the AR focus-object community creation program 110A, 110B may be a program capable of establishing a social network within an AR session by locating, tagging, and aggregating focus objects of a user. The AR focus-object community creation method is explained in further detail below with respect to FIG. 2. The AR focus-object community creation program 110A, 110B may be a discrete program or it may be a subroutine or method integrated into AR program 108. The AR focus-object community creation program 110A, 110B may be located on client computing device 102 or server 112 or on any other device located within network 114. Furthermore, AR focus-object community creation program 110A, 110B may be distributed in its operation over multiple devices, such as client computing device 102 and server 112. AR focus-object community creation program 110A, 110B may be activated by AR program 108, and may be triggered by a gesture by the user, an audio command from the user, or by the user entering coordinates within a geo-fenced location.

Figure 2:
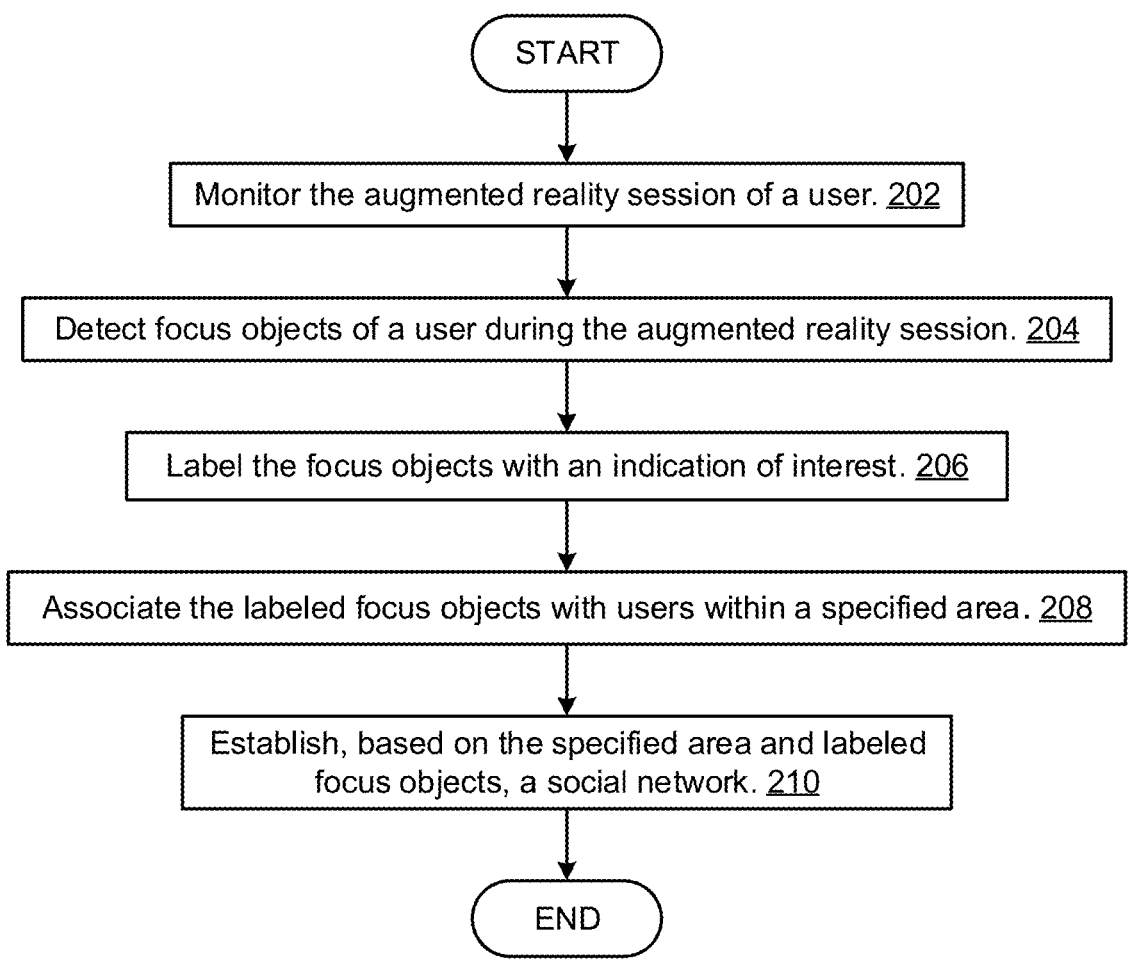
FIG. 2 is an operational flowchart illustrating an augmented reality (AR) community creation process according to at least one embodiment.

Referring now to FIG. 2, an operational flowchart illustrating an AR community creation process 200 is depicted according to at least one embodiment. At 202, the AR focus-object community creation program 110A, 110B monitors the augmented reality session of a user. The augmented reality session may be a real-time or near-real-time video feed corresponding to the vision of the user, which may have computer generated elements overlaid onto it by AR program 108. The AR focus-object community creation program 110A, 110B may monitor the augmented reality session by using any type of video processing software capable of processing video in real time. The video processing may entail identifying individual objects within a live video feed. The video processing may also capture all frames of the video where the image processing detects dwell time on a view to exceed a minimum threshold, for example 3 seconds. The threshold may be user-determined or site-determined. The monitoring may be limited in operation to within a geo-fenced area, to a set number of objects, or to a maximum amount of time.

Next, at 204, AR focus-object community creation program 110A, 110B detects focus objects of a user during the augmented reality session. AR focus-object community creation program 110A, 110B detects focus objects by monitoring which objects are the focus of the user's attention. AR focus-object community creation program 110A, 110B may determine the user to be focusing on an object if the object is centered in the user's field of view, or if the object is kept within the user's range of vision, or any other method of determining focus. An object may be considered to be a 'focus object' if it is the subject of a user's attention for an amount of time that exceeds a threshold, where the threshold may be predetermined by a user or dynamically generated or altered by AR program 108 or AR focus-object community creation program 110A, 110B. Focus objects may also be determined through a gesture by a user, for instance a user may point at an object that the user wants to label as a focus object. AR focus-object community creation program 110A, 110B may limit the number of elements in the photo that are considered focus objects by distance, by limiting object detection to near objects vs. far objects, for instance, or by choosing objects to include based on the focal length of the electronic capture device used to record the video feed. The objects may be detected within the image by any object recognition software, such as OpenCV, or reverse image search software of Google® or Microsoft® (Microsoft® and all Microsoft®-based trademarks and logos are trademarks or registered trademarks of Microsoft Corporation and/or its affiliates). The image search may be performed on the still frames captured from the video feed based on dwell time.

Then, at 206, AR focus-object community creation program 110A, 110B labels the focus objects with an indication of interest. The indication of interest may be the amount of time that the user was focusing on the object, and the total amount of interest may aggregate over an entire session or through a single capture event. AR focus-object community creation program 110A, 110B may also label the focus objects with the location or area of the object, based on the current position (relative or actual) as determined by triangulation or global positioning systems. AR focus-object community creation program 110A, 110B may also use relative positions based on, for instance, a store or park layout. The invention may also label focus objects based on emotions and activities, as well as object details such as time, date, user, and location coordinates. For example, [Alice|green apple|25-FEB-2017|4:00 PM|30 seconds interest|x1, x2]. AR focus-object community creation program 110A, 110B may also label the focus object with a description using adjectives like 'shiny' or other correlated data from correlated social streams.

Next, at 208, AR focus-object community creation program 110A, 110B associates the labeled focus objects with users within a specified area. AR focus-object community creation program 110A, 110B may associate the labeled focus objects with users in a specified area by using the augmented object details in the label (object, date, time, and position) to aggregate all focus objects within a geofenced area. The geofenced area, for instance, may encompass a grocery store, or may encompass a four-block radius. AR focus-object community creation program 110A, 110B may then determine overlap with other uses. For instance, in the following example, three users are presented:

[Bob|green apple|25-FEB-2017|3:00 PM|30 seconds interest|x1, x2]

[Charlie|red apple|25-FEB-2017|4:01 PM|15 seconds interest|x1, x2]

[Eve|green apple|25-FEB-2017|4:00 PM|30 seconds interest|x1, x2]

AR focus-object community creation program 110A, 110B may find overlap between presented objects based on a statistical similarity or characteristic similarity, such as the fact that the three focus objects in the example are all apples, or the invention may determine the overlap with the aggregated focus objects within a set time window. AR focus-object community creation program 110A, 110B may also scope the association between the objects to a time window relative to the current observed labeled object, for instance all labeled objects at Binney Street in the last two days. In this step, AR focus-object community creation program 110A, 110B may incorporate labeled objects that were not sourced from augmented reality sessions, such as photos or other images which are labeled with objects and relative positioning.

Then, at 210, AR focus-object community creation program 110A, 110B establishes, based on the specified area and labeled focus objects, a social network. AR focus-object community creation program 110A, 110B may create the social network by linking the objects within a community of interest, to determine and highlight items that are the focus objects of users within the community of interest and present users the opportunity to converse with the community of interest and other users. AR focus-object community creation program 110A, 110B may allow a user to engage with other users within the community of interest regarding a focus object by, for instance, sourcing messages from that user's network in real-time, or contemporaneous with the user's observation of a focus object. For instance, a first user may see comments from a second user regarding a focus object overlaid over or next to that focus object when the first user looks at the focus object. AR focus-object community creation program 110A, 110B may also add a selective filter based on feedback, and may establish the social network based on specific user characteristics. AR focus-object community creation program 110A, 110B may also maintain a social network proportionally to the time spent observing the focus object; for instance, if a social network is created aggregating fidget spinners for sale in an area, and fidget spinners fall out of favor and cease to be the focus of viewers, AR focus-object community creation program 110A, 110B may dissolve the fidget spinner social network.

It may be appreciated that FIG. 2 provides only an illustration of one implementation and does not imply any limitations with regard to how different embodiments may be implemented. Many modifications to the depicted environments may be made based on design and implementation requirements. In one embodiment of the invention, a focus object that is for sale may be labeled with a link to initiate a purchase process, so that a user need not search an online forum to locate the item and purchase it. In another embodiment, the method may further be integrated with a rewards system related to use of the method within a specified store. For example, the AR focus-object community creation program 110A, 110B may incorporate incentives for the person to participate, such that feedback or focus on objects for sale may yield a coupon or discount. In further embodiments of the invention, AR focus-object community creation program 110A, 110B may calculate the total number of labeled objects within a given area, and limit the labels to focus objects which are likely to engage the user with conversation.

Figure 3:
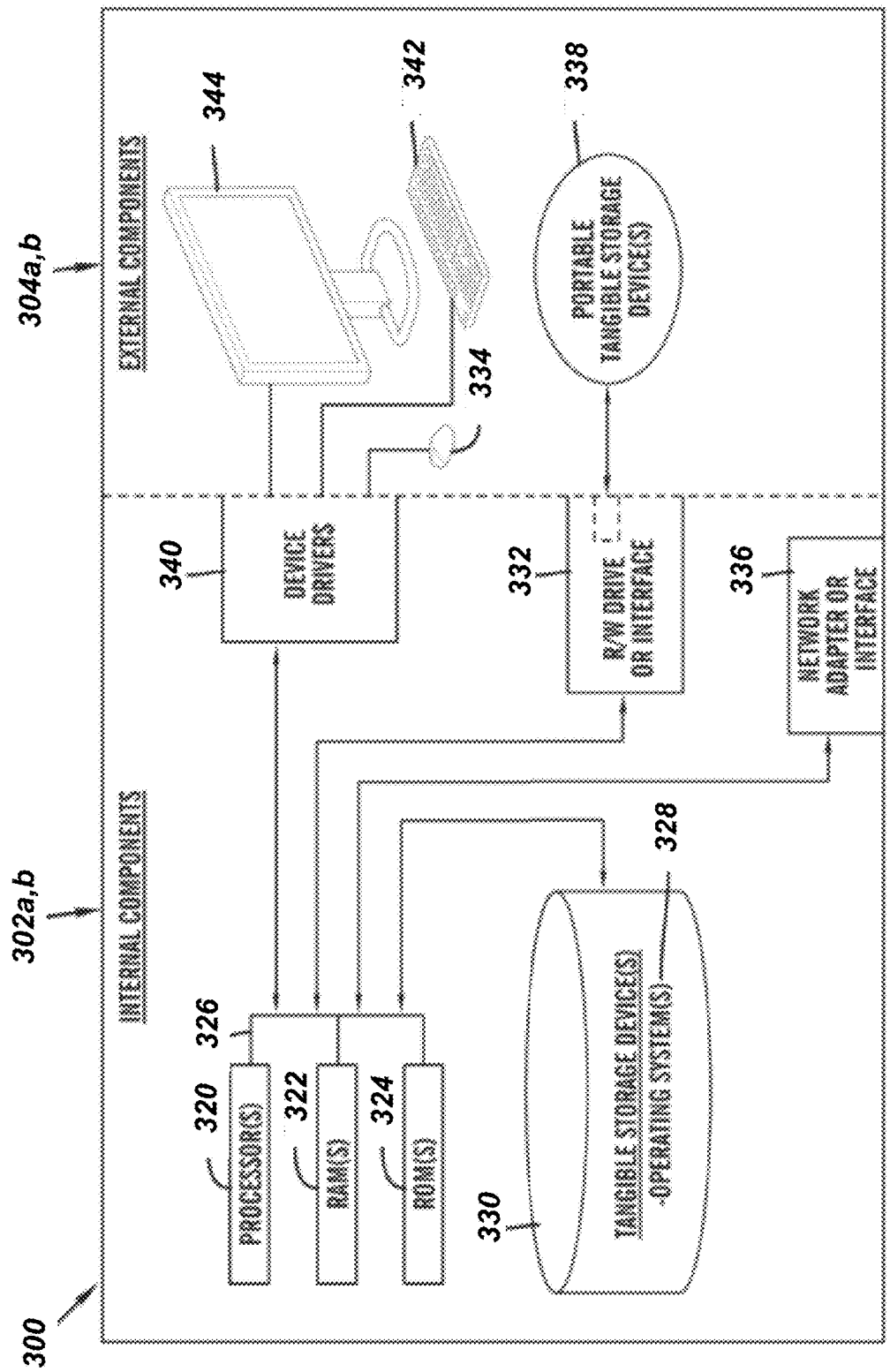
FIG. 3 is a block diagram of internal and external components of computers and servers depicted in FIG. 1 according to at least one embodiment.

FIG. 3 is a block diagram 300 of internal and external components of the client computing device 102 and the server 112 depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 302, 304 is representative of any electronic device capable of executing machine-readable program instructions. The data processing system 302, 304 may be representative of a smart phone, a computer system, PDA, or other electronic devices. Examples of computing systems, environments, and/or configurations that may represented by the data processing system 302, 304 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The client computing device 102 and the server 112 may include respective sets of internal components 302 a,b and external components 304 a,b illustrated in FIG. 3. Each of the sets of internal components 302 include one or more processors 320, one or more computer-readable RAMs 322, and one or more computer-readable ROMs 324 on one or more buses 326, and one or more operating systems 328 and one or more computer-readable tangible storage devices 330. The one or more operating systems 328, the AR program 108 and the AR focus-object community creation program 110A in the client computing device 102, and the AR focus-object community creation program 110B in the server 112 are stored on one or more of the respective computer-readable tangible storage devices 330 for execution by one or more of the respective processors 320 via one or more of the respective RAMs 322 (which typically include cache memory). In the embodiment illustrated in FIG. 3, each of the computer-readable tangible storage devices 330 is a magnetic disk storage device of an internal hard drive. Alternatively, each of the computer-readable tangible storage devices 330 is a semiconductor storage device such as ROM 324, EPROM, flash memory or any other computer-readable tangible storage device that can store a computer program and digital information.

Each set of internal components 302 a,b also includes a R/W drive or interface 332 to read from and write to one or more portable computer-readable tangible storage devices 338 such as a CD-ROM, DVD, memory stick, magnetic tape, magnetic disk, optical disk or semiconductor storage device. A software program, such as the AR focus-object community creation program 110A, 110B, can be stored on one or more of the respective portable computer-readable tangible storage devices 338, read via the respective R/W drive or interface 332, and loaded into the respective hard drive 330.

Each set of internal components 302 a,b also includes network adapters or interfaces 336 such as a TCP/IP adapter cards, wireless Wi-Fi interface cards, or 3G or 4G wireless interface cards or other wired or wireless communication links. The AR program 108 and the AR focus-object community creation program 110A in the client computing device 102 and the AR focus-object community creation program 110B in the server 112 can be downloaded to the client computing device 102 and the server 112 from an external computer via a network (for example, the Internet, a local area network or other, wide area network) and respective network adapters or interfaces 336. From the network adapters or interfaces 336, the AR program 108 and the AR focus-object community creation program 110A in the client computing device 102 and the AR focus-object community creation program 110B in the server 112 are loaded into the respective hard drive 330. The network may comprise copper wires, optical fibers, wireless transmission, routers, firewalls, switches, gateway computers and/or edge servers.

Each of the sets of external components 304 a,b can include a computer display monitor 344, a keyboard 342, and a computer mouse 334. External components 304 a,b can also include touch screens, virtual keyboards, touch pads, pointing devices, and other human interface devices. Each of the sets of internal components 302 a,b also includes device drivers 340 to interface to computer display monitor 344, keyboard 342, and computer mouse 334. The device drivers 340, R/W drive or interface 332, and network adapter or interface 336 comprise hardware and software (stored in storage device 330 and/or ROM 324).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
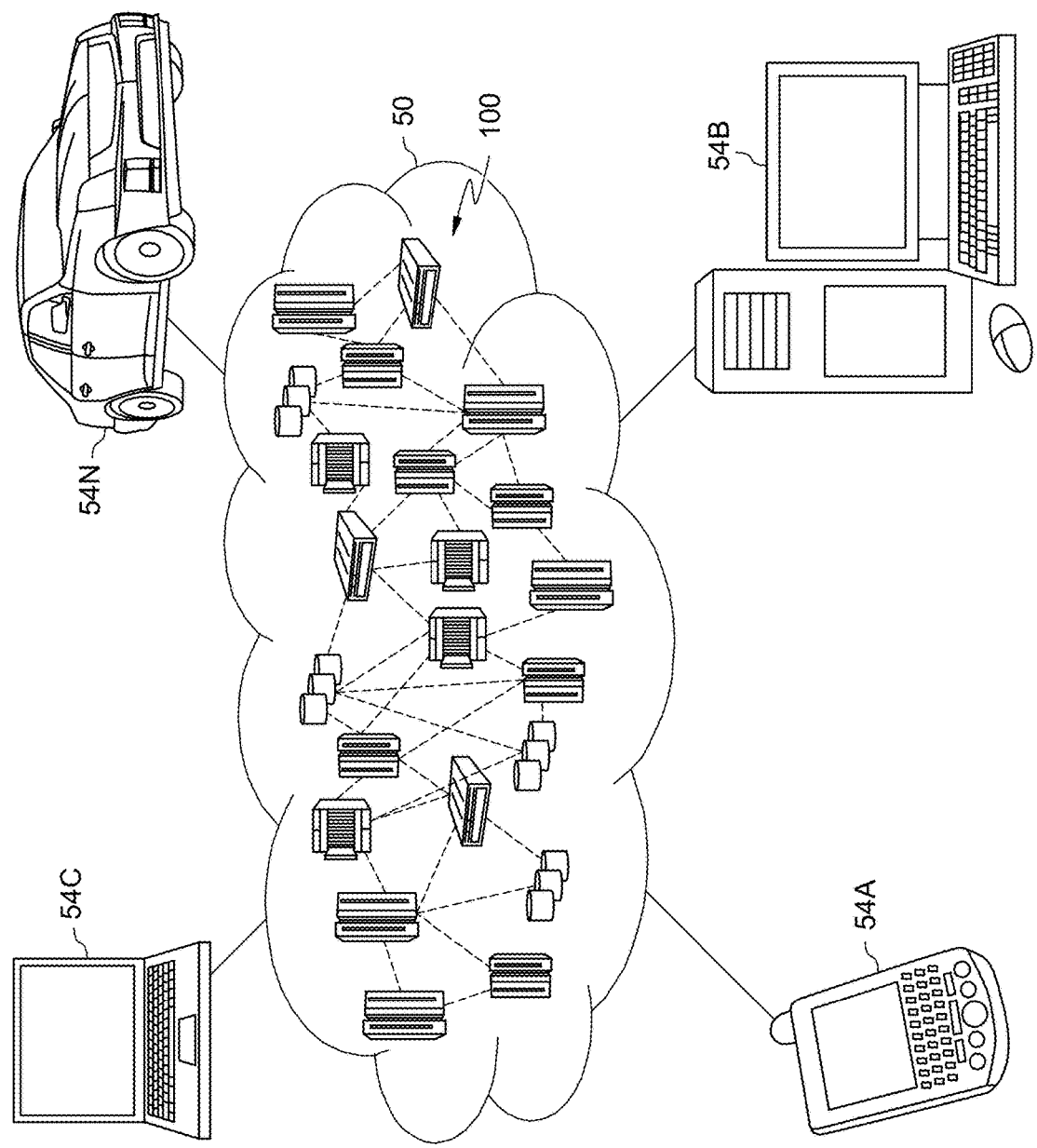
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
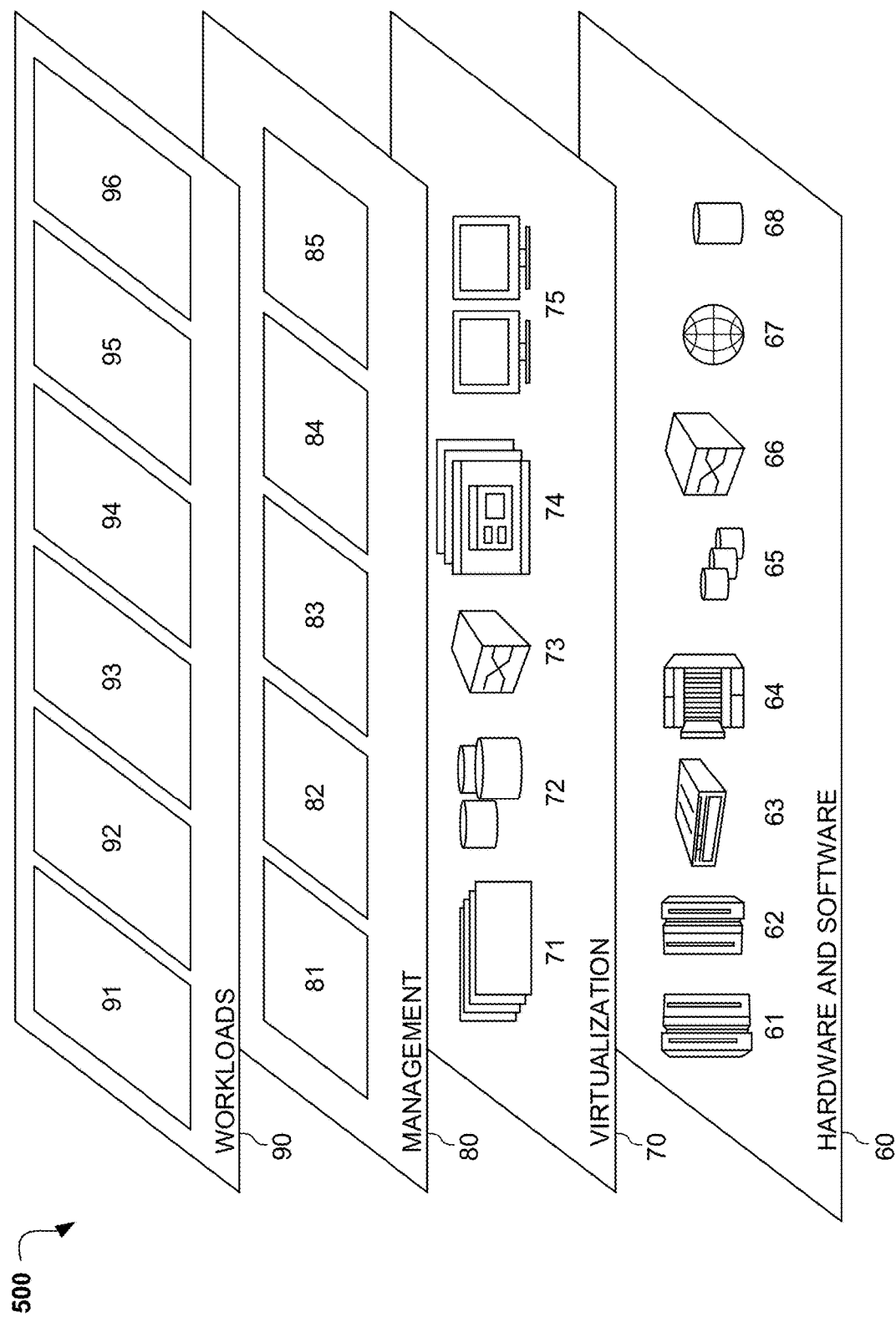
FIG. 5 depicts abstraction model layers according to an embodiment of the present invention.

Referring now to FIG. 5, a set of functional abstraction layers 500 provided by cloud computing environment 50 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and AR community creation 96. AR focus-object community creation 96 may relate to establishing a social network within an AR session by locating, tagging, and aggregating focus objects of a user.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for creating a social network based on focus objects, the method comprising:
   monitoring an augmented reality session of a user;
   detecting one or more focus objects of the user during the monitored augmented reality session;
   labeling the one or more detected focus objects with one or more indications of interest, wherein the indication of interest enumerates a duration that the user has focused on the one or more detected focus objects;
   associating the one or more labeled detected focus objects with one or more additional users; and
   establishing, based on the labeled detected focus objects, a social network, wherein the social network contains one or more focus objects sourced from the one or more additional users, wherein the social network aggregates a plurality of focus objects within a geofenced area.

2. The method of claim 1, wherein feedback from one or more additional users is associated with one or more focus objects, and wherein the feedback is made visible to one or more users upon viewing the one or more focus objects.

3. The method of claim 1, wherein labeling any of the one or more focus objects that are available for purchase further comprises:
   adding a purchase link label to the one or more purchasable focus objects, where the purchase link label directs the user to a location where the one or more purchasable focus objects are available for purchase.

4. The method of claim 1, wherein a total number of the one or more labeled focus objects within an area is calculated, and made available to the user based on a relevance to one or more user interests.

5. The method of claim 1, wherein the one or more indicators of interest comprise a dwell time within a view that exceeds a threshold duration.

6. The method of claim 1, wherein the social network is associated with a rewards program based on the one or more indications of interest.

7. A computer system for creating a social network based on focus objects, the computer system comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   monitoring an augmented reality session of a user;
   detecting one or more focus objects of the user during the monitored augmented reality session;
   labeling the one or more detected focus objects with one or more indications of interest, wherein the indication of interest enumerates a duration that the user has focused on the one or more detected focus objects;
   associating the one or more labeled detected focus objects with one or more additional users; and
   establishing, based on the labeled detected focus objects, a social network, where the social network contains one or more focus objects sourced from the one or more additional users, wherein the social network aggregates a plurality of focus objects within a geofenced area.

8. The computer system of claim 7, wherein feedback from one or more additional users is associated with one or more focus objects, and wherein the feedback is made visible to one or more users upon viewing the one or more focus objects.

9. The computer system of claim 7, wherein labeling any of the one or more focus objects that are available for purchase further comprises:
   adding a purchase link label to the one or more purchasable focus objects, where the purchase link label directs the user to a location where the one or more purchasable focus objects are available for purchase.

10. The computer system of claim 7, wherein a total number of the one or more labeled focus objects within an area is calculated, and made available to the user based on a relevance to one or more user interests.

11. The computer system of claim 7, wherein the one or more indicators of interest comprise a dwell time within a view that exceeds a threshold duration.

12. The computer system of claim 7, wherein the social network is associated with a rewards program based on the one or more indications of interest.

13. A computer program product for creating a social network based on focus objects, the computer program product comprising:
   one or more computer-readable tangible storage medium and program instructions stored on at least one of the one or more tangible storage medium, the program instructions executable by a processor to cause the processor to perform a method comprising:

monitoring an augmented reality session of a user;
detecting one or more focus objects of the user during the monitored augmented reality session;
labeling the one or more detected focus objects with one or more indications of interest, wherein the indication of interest enumerates a duration that the user has focused on the one or more detected focus objects;
associating the one or more labeled detected focus objects with one or more additional users; and
establishing, based on the labeled detected focus objects, a social network, wherein the social network contains one or more focus objects sourced from the one or more additional users, wherein the social network aggregates a plurality of focus objects within a geofenced area.

14. The computer program product of claim 13, wherein feedback from one or more additional users is associated with one or more focus objects, and wherein the feedback is made visible to one or more users upon viewing the one or more focus objects.

15. The computer program product of claim 13, wherein labeling any of the one or more focus objects that are available for purchase further comprises:
adding a purchase link label to the one or more purchasable focus objects, where the purchase link label directs the user to a location where the one or more purchasable focus objects are available for purchase.

16. The computer program product of claim 13, wherein a total number of the one or more labeled focus objects within an area is calculated, and made available to the user based on a relevance to one or more user interests.

17. The computer program product of claim 13, wherein the one or more indicators of interest comprise a dwell time within a view that exceeds a threshold duration.

* * * * *